United States Patent
Twaddell et al.

(10) Patent No.: US 11,240,886 B2
(45) Date of Patent: *Feb. 1, 2022

(54) CONTROL DEVICE HAVING BUTTONS WITH AUTOMATICALLY ADJUSTABLE BACKLIGHTING

(71) Applicant: Lutron Technology Company LLC, Coopersburg, PA (US)

(72) Inventors: Daniel L. Twaddell, Bethlehem, PA (US); Matthew Philip McDonald, Phoenixville, PA (US); Jason C. Killo, Emmaus, PA (US); Jonathan Robert Quayle, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,463

(22) Filed: Feb. 8, 2019

(65) Prior Publication Data
US 2019/0174598 A1 Jun. 6, 2019

Related U.S. Application Data

(63) Continuation of application No. 15/857,058, filed on Dec. 28, 2017, now Pat. No. 10,212,777, which is a (Continued)

(51) Int. Cl.
*H05B 33/08* (2020.01)
*H02B 15/00* (2006.01)
(Continued)

(52) U.S. Cl.
CPC .............. *H05B 31/50* (2013.01); *H01H 13/83* (2013.01); *H05B 45/12* (2020.01); *H05B 47/10* (2020.01);
(Continued)

(58) Field of Classification Search
CPC ............ H05B 37/0218; H05B 37/0227; H05B 37/0272; H05B 47/10; H05B 47/11;
(Continued)

(56) References Cited

U.S. PATENT DOCUMENTS 5,569,939 A 10/1996 Choi
6,803,728 B2 10/2004 Balasubramaniam et al.
(Continued)

FOREIGN PATENT DOCUMENTS

CN 1198539 A 11/1998
CN 201465849 U 5/2010
(Continued)

*Primary Examiner* — Amy Cohen Johnson
*Assistant Examiner* — Syed M Kaiser
(74) *Attorney, Agent, or Firm* — Michael Czarnecki; Glen Farbanish; Philip Smith

(57) ABSTRACT

A control device may comprise a plurality of buttons, a plurality of light sources located behind the respective buttons and configured to illuminate the buttons, a light detector circuit configured to measure an ambient light level around the control device, and/or a control circuit configured to control the light sources to adjust surface illumination intensities of the respective buttons in response to the measured ambient light level. Each button may comprise indicia indicating a function of the button. The control circuit set the first button as active and the second button as inactive in response to an actuation of the first button. The control circuit may, based on the measured ambient light level, control the light sources to illuminate the first button to an active surface illumination intensity, and to illuminate the second button to an inactive surface illumination intensity that is less than the active surface illumination intensity.

16 Claims, 7 Drawing Sheets

Related U.S. Application Data continuation of application No. 15/165,579, filed on May 26, 2016, now Pat. No. 9,860,952.

(60) Provisional application No. 62/166,208, filed on May 26, 2015.

(51) Int. Cl.

| | |
|---|---|
| *H05B 37/02* | (2006.01) |
| *H05B 45/10* | (2020.01) |
| *H05B 47/10* | (2020.01) |
| *H05B 31/50* | (2006.01) |
| *H01H 13/83* | (2006.01) |
| *H05B 47/11* | (2020.01) |
| *H05B 47/175* | (2020.01) |
| *H05B 45/12* | (2020.01) |

(52) U.S. Cl.
CPC .......... *H05B 47/11* (2020.01); *H05B 47/175* (2020.01); *H01H 2219/038* (2013.01); *H01H 2219/039* (2013.01); *H02B 15/00* (2013.01); *Y02B 20/40* (2013.01)

(58) Field of Classification Search
CPC ...... H05B 47/20; H05B 47/175; H05B 45/37; H01H 13/83; H02B 15/00; G06F 3/017; G02B 27/0172
USPC ........ 315/153, 224, 297, 307, 200 R, 185 R; 29/622
See application file for complete search history.

(56) References Cited

U.S. PATENT DOCUMENTS

| | | | |
|---|---|---|---|
| 7,038,398 B1 * | 5/2006 | Lys ................. | H05B 45/20 315/291 |
| 7,135,664 B2 | 11/2006 | Vornsand et al. | |
| 7,236,154 B1 | 6/2007 | Kerr et al. | |
| 7,333,031 B1 | 2/2008 | Bantner | |
| 7,361,853 B2 | 4/2008 | Clegg et al. | |
| 7,414,210 B2 | 8/2008 | Clegg et al. | |
| 7,432,460 B2 | 10/2008 | Clegg et al. | |
| 7,432,463 B2 | 10/2008 | Clegg et al. | |
| 7,572,028 B2 * | 8/2009 | Mueller ............ | H05B 45/20 362/227 |
| 7,786,623 B2 | 8/2010 | Farmer et al. | |
| 7,796,057 B2 | 9/2010 | Swatsky et al. | |
| 7,825,891 B2 | 11/2010 | Yao et al. | |
| 8,009,042 B2 | 8/2011 | Steiner et al. | |
| 8,031,164 B2 | 10/2011 | Herz et al. | |
| 8,077,058 B2 | 12/2011 | Swatsky et al. | |
| 8,102,375 B1 * | 1/2012 | Feldstein ........ | G06F 3/02 341/23 |
| 8,194,031 B2 | 6/2012 | Yao et al. | |
| 8,282,261 B2 | 10/2012 | Pance et al. | |
| 8,451,116 B2 * | 5/2013 | Steiner ............ | G01J 1/44 340/545.3 |
| 8,502,473 B2 * | 8/2013 | Dobkin ............ | H04M 1/22 315/307 |
| 8,698,727 B2 | 4/2014 | Herz et al. | |
| 8,698,792 B2 | 4/2014 | Chang et al. | |
| 8,829,799 B2 * | 9/2014 | Recker ............ | H05B 47/19 315/160 |
| 9,066,381 B2 * | 6/2015 | Valois ............ | H05B 45/10 |
| 9,392,660 B2 * | 7/2016 | Dias ............... | H05B 45/14 |
| 9,392,663 B2 * | 7/2016 | Knapp ............ | H05B 45/24 |
| 9,402,295 B2 * | 7/2016 | Lipscombe ....... | H05B 47/19 |
| 9,860,952 B2 | 1/2018 | Twaddell et al. | |
| 2003/0000817 A1 | 1/2003 | Farage et al. | |
| 2006/0022951 A1 | 2/2006 | Hull | |
| 2007/0097065 A1 * | 5/2007 | Kreek ............. | G09G 3/3406 345/102 |
| 2007/0139316 A1 | 6/2007 | Hyatt | |
| 2007/0209912 A1 * | 9/2007 | Clegg ............. | H01H 13/70 200/5 A |
| 2009/0174664 A1 * | 7/2009 | Han .............. | H03K 17/9622 345/168 |
| 2009/0284459 A1 | 11/2009 | Wallener et al. | |
| 2010/0141153 A1 * | 6/2010 | Recker ........... | H05B 33/0803 315/149 |
| 2010/0300856 A1 * | 12/2010 | Pance ............. | G02B 6/0001 200/314 |
| 2010/0302162 A1 | 12/2010 | Jo | |
| 2010/0302169 A1 | 12/2010 | Pance et al. | |
| 2010/0306683 A1 | 12/2010 | Pance et al. | |
| 2012/0206369 A1 | 8/2012 | Chou et al. | |
| 2013/0015985 A1 | 1/2013 | Peterson et al. | |
| 2013/0082612 A1 * | 4/2013 | Kim .............. | H05B 45/22 315/185 R |
| 2013/0201111 A1 | 8/2013 | Pance et al. | |
| 2013/0313535 A1 | 11/2013 | Heo et al. | |
| 2014/0001977 A1 | 1/2014 | Zacharchuk et al. | |
| 2014/0097758 A1 * | 4/2014 | Recker ........... | H05B 47/19 315/152 |
| 2014/0263977 A1 * | 9/2014 | Jones ............. | G01J 1/4204 250/14 AL |
| 2015/0048758 A1 * | 2/2015 | Carrigan ......... | H05B 47/19 315/294 |
| 2015/0116080 A1 * | 4/2015 | Cregg ............ | G07C 9/28 340/5.54 |
| 2015/0120598 A1 * | 4/2015 | Fadell ........... | G06Q 10/083 705/333 |
| 2015/0203056 A1 * | 7/2015 | Adkins .......... | H03K 17/962 307/10.1 |
| 2015/0242933 A1 * | 8/2015 | Beguin .......... | G06Q 30/0633 705/26.8 |
| 2015/0334799 A1 | 11/2015 | Ascorra et al. | |
| 2015/0351191 A1 * | 12/2015 | Pope ............. | H05B 45/10 315/294 |
| 2016/0066078 A1 * | 3/2016 | Baek ............. | H04M 1/0241 381/74 |
| 2016/0073467 A1 | 3/2016 | McDonald et al. | |
| 2016/0286616 A1 * | 9/2016 | van de Ven ...... | H05B 47/105 |

FOREIGN PATENT DOCUMENTS

| | | |
|---|---|---|
| CN | 101923978 A | 12/2010 |
| CN | 103179748 A | 6/2013 |
| CN | 104540289 A | 4/2015 |
| EP | 1 628 459 A1 | 2/2006 |
| EP | 2848137 A1 | 3/2015 |
| WO | WO 2009/053771 A1 | 4/2009 |

* cited by examiner

CONTROL DEVICE HAVING BUTTONS WITH AUTOMATICALLY ADJUSTABLE BACKLIGHTING

CROSS-REFERENCE TO RELATED APPLICATIONS

This application is a continuation of U.S. patent application Ser. No. 15/857,058, filed Dec. 28, 2017, which is a continuation of U.S. patent application Ser. No. 15/165,579, filed May 26, 2016, now U.S. Pat. No. 9,860,952, issued on Jan. 2, 2018, which claims the benefit of Provisional U.S. Patent Application No. 62/166,208, filed May 26, 2015, the disclosure of which is incorporated herein by reference in its entirety.

BACKGROUND

Home automation systems, which have become increasing popular, may be used by homeowners to integrate and control multiple electrical and/or electronic devices in their house. For example, a homeowner may connect appliances, lights, blinds, thermostats, cable or satellite boxes, security systems, telecommunication systems, and the like to each other via a wireless network. The homeowner may control these devices using a controller, a remote control device (e.g., such as a wall-mounted keypad), and/or a user interface provided via a phone, a tablet, a computer, or the like directly connected to the network or remotely connected via the Internet. These devices may communicate with each other and the controller to, for example, improve their efficiency, their convenience, and/or their usability.

The user interface used to control the multiple electrical and/or electronic devices may provide backlighting that indicates which button is selected and which button(s) are unselected. However, the intensity of this backlighting may be inconsistent when viewed in various light levels. For example, the user may be able to easily distinguish between the selected and unselected buttons in higher light level situations, but it may be difficult to distinguish between the selected and unselected buttons in low light level situations, or vice versa. As such, a need exists to for systems and methods that provide for automatically adjustable backlighting that, for example, is based on the current ambient lighting conditions in the space.

SUMMARY

The present disclosure relates to a load control system for controlling the amount of power delivered to an electrical load, such as a lighting load, and more particularly, to a keypad having buttons with backlighting for use in a load control system.

As described herein, a control device may comprise first and second buttons, first and second light sources, a light detector circuit, and/or a control circuit. The first and second light sources may be located behind the respective buttons and may be configured to illuminate the buttons. The light detector circuit may be configured to measure an ambient light level in the vicinity around the control device. The control circuit may be configured to control the light sources to adjust surface illumination intensities of the respective buttons in response to the measured ambient light level. One or more of the buttons (e.g., each button) may comprise indicia indicating a function of the button. The control circuit may be responsive to actuations of the buttons. For example, the control circuit may be configured to set the first button as active and the second button as inactive in response to an actuation of the first button. The control circuit may be configured to control the first and second light sources to illuminate the first button to an active surface illumination intensity and to illuminate the second button to an inactive surface illumination intensity that is less than the active surface illumination intensity. The control circuit may be configured to adjust the active and inactive surface illumination intensities in response to the ambient light level measured by the light detector circuit.

The control circuit may be further configured to adjust the active and inactive surface illumination intensities in response to the ambient light level measured by the light detector circuit using active and inactive adjustment curves stored in memory. The active and inactive adjustment curves may be non-linearly related. Further, the control circuit may provide active or inactive adjustment curves, and for example, the control circuit may be configured to select a particular active or inactive adjustment curve based on user selection.

The control device described herein may further comprise a communication circuit. The communication circuit may be configured to receive a signal from an external device, and the signal may comprise information relating to the first and/or second adjustment curves. The information received via the signal may be used by the control circuit to adjust the first and/or second adjustment curves. For example, the control circuit may adjust the first adjustment curve while maintaining the second adjustment curve the same in response to the information received via the signal. The control circuit may control a contrast between the first and second surface illumination intensities associated with the first and second adjustment curves via the adjustment. The information received via the signal may comprise a scaling factor and/or an offset. The control circuit may be configured to generate the first and second adjustment curves based on the scaling factor and/or the offset.

DETAILED DESCRIPTION

Figure 1:
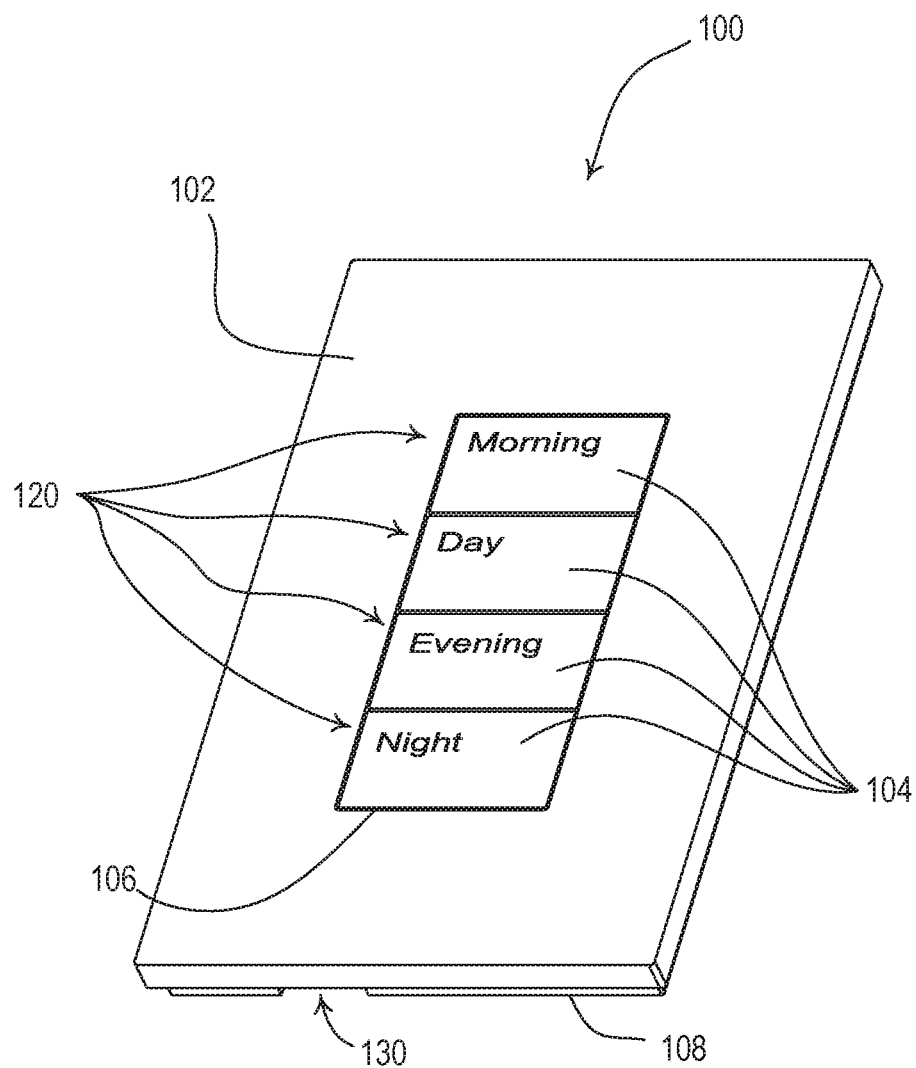
FIG. 1 is a diagram of a perspective view of an example control device (e.g., a wall-mounted keypad) for use in a load control system for controlling the amount of power delivered to one or more electrical loads.

FIG. 1 is a diagram of a perspective view of an example control device (e.g., a wall-mounted keypad 100) for use in a load control system for controlling the amount of power delivered to one or more electrical loads (e.g., lighting loads). The keypad 100 may comprise a faceplate 102 and a plurality of buttons 104 (e.g., four buttons) received through an opening 106 of the faceplate 102. The faceplate 102 and the buttons 104 may comprise a plastic surface, a glass surface, and/or a metallic surface. The faceplate 102 may be configured to be attached (e.g., snapped) to an adapter 108, which may be attached (e.g., using screws) to an enclosure (not shown) that houses the electrical circuitry of the keypad 100.

The keypad 100 may be configured to transmit a digital message to one or more external load control device via a communication link for controlling respective electrical loads. The communication link may comprise a wired communication link or a wireless communication link, such as a radio-frequency (RF) communication link. Alternatively, the keypad 100 may comprise an internal load control circuit for controlling the power delivered to one or more electrical loads. Examples of load control systems having remote control devices, such as the keypad 100, are described in greater detail in commonly-assigned U.S. Pat. No. 6,803,728, issued Oct. 12, 2004, entitled SYSTEM FOR CONTROL OF DEVICES, and U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, the entire disclosures of which are hereby incorporated by reference.

One or more of the buttons 104 may comprise indicia, such as text 120, for indicating a preset (e.g., a lighting scene) or command (e.g., on/off, raise/lower, etc.) that may be transmitted in response to an actuation of the button 104. Alternatively or additionally, the indicia on the button 104 may comprise an icon or symbol. The buttons 104 may be backlit to allow the indicia to be read in a wide range of ambient light levels. Each button 104 may be made of a translucent (e.g., transparent, clear, and/or diffusive) material, such as plastic or glass. Alternatively or additionally, each buttons 104 may comprise a plastic surface, a glass surface, or a metallic surface. The buttons 104 may be illuminated by one or more light sources (e.g., LEDs) located behind or to the side of each button (e.g., inside of the keypad 100), for example, such that light is emitted through the indicia and the indicia is illuminated.

In some embodiments, each button 104 may have a translucent body (not shown) and an opaque material, e.g., a metallic sheet (not shown), adhered to a front surface of the body. The text 120 may be etched into the metallic sheet of each button 104 (e.g., through a machining process, laser cutting, photo-etching, or other metal-removal process). The illumination from the light source may shine through the translucent body, but not through the metallic sheet, such that the text 120 of each button (e.g., that is etched away from the metallic sheet) is illuminated. Alternatively, the buttons 104 may be coated with another type of opaque material, such as paint, and the text 120 may be etched into the paint. The body 112 of the button 104 may be made of another type of translucent material, such as glass. The opaque material (such as paint) may be coated onto the rear surface 118 of the body 110 and the text 118 may be etched into paint on the rear surface of the body.

The faceplate 102 may comprise indicia that, for example, may be backlit to allow the indicia to be read in a wide range of ambient light levels. The indicia of the faceplate 102 may be backlit by one or more light sources (e.g., LEDs) located behind or to the side of the faceplate 102. For example, the faceplate 102 and the indicia may be composed in a manner similar to the buttons 104 and/or the light source(s) associated with the faceplate 102 may be illuminated in a similar manner as described with respect the light sources associated with the buttons 104.

One or more of the buttons 104 may be selected by a user (e.g., via actuation of the button), while the remaining button(s) 104 may be unselected. The keypad 100 may operate to backlight the buttons 104, such that the text 120 of the selected button 104 (e.g., a selected preset or an "active" preset) is illuminated to an active surface illumination intensity $L_{SUR1}$, and the text 120 of the unselected buttons 104 (e.g., the other presets or "inactive" presets) is illuminated to an inactive surface illumination intensity $L_{SUR2}$. The active surface illumination intensity $L_{SUR1}$ may be greater than the inactive surface illumination intensity $L_{SUR2}$, such that a user may identify which of the buttons 104 is selected based upon the intensity of the illumination of the text 120.

The ambient light level in the room in which the keypad 100 is installed may affect a user's ability to read the text 120 on the buttons 104. Additionally, the color of the walls, floors, keypad 100, etc. may also affect the surface illumination intensity $L_{SUR1}$, $L_{SUR2}$ perceived by the user. For example, if the contrast between the brightness of the illuminated text 120 and the brightness of the adjacent surface of the button 104 is too low, the illuminated text may appear washed out to the user. Accordingly, the keypad 100 may comprise an ambient light detection circuit (not shown), which may be located inside of the keypad and may be configured to measure the ambient light level in the room in which the keypad 100 is installed. For example, the keypad 100 may comprise an opening 130 in the adapter 108 through which the ambient light detection circuit may receive light to make a determination of the ambient light level in the room. Alternatively or additionally, the keypad 100 may comprise an opening in the faceplate 102 and/or one or more of the buttons 104 for allowing the ambient light detection circuit to receive light. In addition, the ambient light detection circuit may be configured to receive light through the gaps between the buttons 104 and/or through the material of the buttons. The ambient light detection circuit may also be positioned behind a semi-transparent or dark window and may be configured to receive light through the window. The keypad 100 may comprise a light pipe for directing light from outside of the keypad to the ambient light detection circuit.

The keypad 100 may be configured to adjust the active and inactive surface illumination intensities $L_{SUR1}$, $L_{SUR2}$ in response to the measured ambient light level. For example, the keypad 100 may be configured to increase the active and inactive surface illumination intensities $L_{SUR1}$, $L_{SUR2}$ if the ambient light level increases, and configured to decrease the active and inactive surface illumination intensities $L_{SUR1}$, $L_{SUR2}$ if the ambient light level decreases. As such, the keypad 100 may reduce the affect that the ambient light level in the room and other external factors (e.g., color of the walls, floor, keypad 100, etc.) have on the user's ability to read the text 120 on the buttons 104, and for example, distinguish between a selected an unselected button 104.

Figure 2:
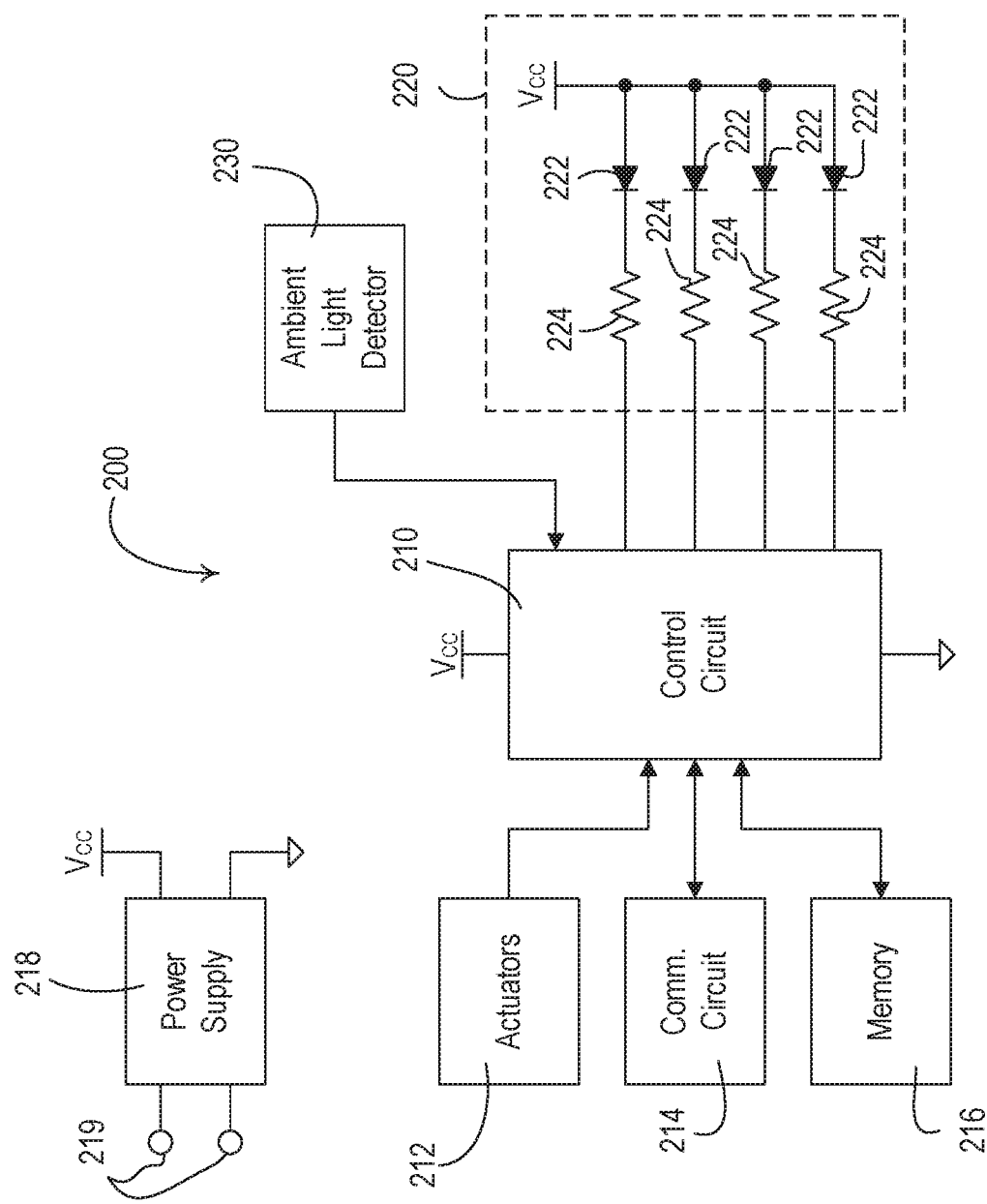
FIG. 2 is a diagram of a block diagram of an example control device.

FIG. 2 is a block diagram of an example load control device 200. The control device 200 may, for example, be deployed as the keypad 100 shown in FIG. 1. The control device 200 may comprise a control circuit 210, which may include one or more of a processor (e.g., a microprocessor), a microcontroller, a programmable logic device (PLD), a field programmable gate array (FPGA), an application specific integrated circuit (ASIC), or any suitable processing device. The control device 200 may comprise one or more actuators 212 (e.g., mechanical tactile switches), which may be actuated in response to actuations of the buttons 104. The control circuit 210 may be coupled to the actuators 212 for receiving user inputs. Alternatively, the control device 200 may comprise one or more touchscreen user interfaces instead of physical buttons (e.g., a capacitive based touchscreen, resistive based touchscreen, etc.), and the control circuit 210 may be coupled to the touchscreen for receiving user inputs.

The control device 200 may further comprise a communication circuit 214, such as, a wired communication circuit or a wireless communication circuit (e.g., an RF transmitter coupled to an antenna for transmitting RF signals). The control circuit 210 may be coupled to the communication circuit 214 for transmitting digital messages in response actuations of the actuators. Alternatively or additionally, the communication circuit 214 may include an RF receiver for receiving RF signals, an RF transceiver for transmitting and receiving RF signals, or an infrared (IR) transmitter for transmitter IR signals. The control circuit 210 may be configured to receive a digital message including, for example, a selected preset and/or the status of an electrical load controlled by an external load control device. The control circuit 210 may also be configured to one or more digital messages including configuration information for the control device 200, for example, from a system controller of the load control system in which the control device is operating and/or from a network device, such as a laptop, a smart phone, a tablet, or similar device.

The control device 200 may also include a memory 216 communicatively coupled to the control circuit 210. The control circuit 210 may be configured to use the memory 216 for the storage and/or retrieval of, for example, commands and/or preset information to transmit in response to actuations of the buttons 104. The memory 216 may be implemented as an external integrated circuit (IC) or as an internal circuit of the control circuit 210.

The control device 200 may also comprise a power supply 218 for generating a direct-current (DC) supply voltage $V_{CC}$ for powering the control circuit 210, the communication circuit 214, the memory 216, and/or other low-voltage circuitry of the control device. The power supply 218 may be coupled to an alternating-current (AC) power source or an external DC power source via electrical connections 219. The control device 200 may comprise an internal power source (e.g., one or more batteries) for supplying power to the power supply 218.

The control device 200 may comprise a backlighting circuit 220 for illuminating indicia on one or more buttons (e.g., the buttons 104 of the keypad 100). For example, the backlighting circuit 220 may comprise four LEDs 222 coupled respective ports on the control circuit 210 respective resistors 224. The control circuit 210 may be configured to individually turn each LED 222 on by pulling the respective port low towards circuit common, such that the LED is coupled between the supply voltage $V_{CC}$ and circuit common through the respective resistor 224. The control circuit 210 may be configured to adjust (e.g., dim) the illumination of each LED 222. For example, the control circuit 210 may be configured to adjust the illumination of an LED 222 by pulse-width modulating (PWM) the LED current conducted through the LED and adjusting a duty cycle $DC_{LED}$ of the pulse-width modulated LED current.

While the control device 200 shown in FIG. 2 has one LED 222 for illuminating each of the buttons 104, each LED illustrated in FIG. 2 may comprise one or more LEDs coupled in series or parallel. For example, each LED 222 in FIG. 2 may comprise four LEDs coupled in series. For example, the LEDs 222 may comprise white LEDs. Each of the resistors 224 coupled in series with the respective LEDs 222 may have a resistance sized such that the maximum average magnitude of LED current may be approximately 20 mA.

The control circuit 210 may be configured to backlight buttons (e.g., the buttons 104), such that the text of a specific button (e.g., a button having indicia indicating a selected preset, which may be referred to as "the selected button" or "the active button") is illuminated to an active surface illumination intensity $L_{SUR1}$, and the indicia of each of the other buttons (e.g., which may be referred to as "the unselected buttons" or "the inactive buttons") is illuminated to an inactive surface illumination intensity $L_{SUR2}$, where the inactive surface illumination intensity $L_{SUR2}$ is less than the active surface illumination intensity $L_{SUR1}$. To illuminate the text of one of the buttons 104 to the active surface illumination intensity $L_{SUR1}$, the control circuit 210 may pulse-width modulate the LED current through the LED behind the selected button using a first LED duty cycle $DC_{LED1}$ to cause the respective LED to illuminate to a first LED illumination intensity $L_{LED1}$. To illuminate the text of one of the buttons 104 to the inactive surface illumination intensity $L_{SUR2}$, the control circuit 210 may pulse-width modulate the LED current through the LED behind the button using a second LED duty cycle $DC_{LED2}$ to cause the respective LED to illuminate to a second LED illumination intensity $L_{LED2}$. The second LED illumination intensity $L_{LED2}$ may be less that the first LED illumination intensity $L_{LED1}$, such that the light illuminated by the second LED is less than the light illuminated by the first LED (e.g., the inactive surface illumination intensity $L_{SUR2}$ is less than the active surface illumination intensity $L_{SUR1}$).

The control circuit 210 may be configured to backlight two or more locations of the control device 200 to different surface illumination intensities (e.g., the active surface illumination intensity $L_{SUR1}$ and the inactive surface illumination intensity $L_{SUR2}$) based on a measured ambient light level. For example, the control device 200 may include a faceplate (e.g., faceplate 102), and the faceplate may include indicia (e.g., that may indicate a name of the control device 200, a user's name, and/or other indicia). The control device 200 may be configured to illuminate different indicia of the faceplate to different surface illumination intensities, and/or the control device 200 may be configured to illuminate indicia of the faceplate to one surface illumination intensity and one or more buttons to another surface illumination intensity. Further, the control circuit 210 may be configured to illuminate different locations of a single button of the control device 200 to different surface illumination intensities.

The control device 200 may comprise an ambient light detector 230 (e.g., an ambient light detection circuit) for measuring an ambient light level LAMB in the room in which the control device 200 is installed. The ambient light detector 230 may generate an ambient light detect signal, which may indicate the ambient light level LAMB and may be received by the control circuit 210. The ambient light detect signal may be an analog signal or a digital signal. The control circuit 210 may be configured to adjust the first and second LED illumination intensities $L_{LED1}$, $L_{LED2}$ in response to the measured ambient light level LAMB, for example, as may be determined from ambient light detect signal. For example, the control circuit 210 may be configured to increase the first and second LED illumination intensities $L_{LED1}$, $L_{LED2}$ to increase the active and inactive surface illumination intensities $L_{SUR1}$, $L_{SUR2}$ if the ambient light level increases. The control circuit 210 may be configured to decrease the first and second LED illumination intensities $L_{LED1}$, $L_{LED2}$ to decrease the active and inactive surface illumination intensities $L_{SUR1}$, $L_{SUR2}$ if the ambient light level decreases.

The control circuit 210 may be configured to adjust the first and second LED illumination intensities $L_{LED1}$, $L_{LED2}$ by adjusting the duty cycle $DC_{LED}$ of the LED current through each of the LED behind the respective buttons. For example, the control circuit 210 may adjust the first duty cycle $DC_{LED1}$ of the LED current through the LED behind the button having the active preset in response to the measured ambient light level LAMB according an active LED adjustment curve $DC_{ACTIVE}$, and adjust the second duty cycle $DC_{LED2}$ of the LED current through each of the LEDs behind the buttons having the inactive presets in response to the measured ambient light level LAMB according an inactive LED adjustment curve $DC_{INACTIVE}$.

The control circuit 210 may store the active LED adjustment curve $DC_{ACTIVE}$ and the inactive LED adjustment curve $DC_{INACTIVE}$ in the memory 216. The active LED adjustment curve $DC_{ACTIVE}$ and the inactive LED adjustment curve $DC_{INACTIVE}$ may be stored in tables with a value of the duty cycle $DC_{LED}$ for each of multiple measured ambient light levels LAMB. The active LED adjustment curve $DC_{ACTIVE}$ and the inactive LED adjustment curve $DC_{INACTIVE}$ may be defined by predetermined functions characterized by one or more parameters, such as, a scaling factor (e.g., a slope) and an offset (e.g., a y-axis intercept). The control circuit 210 may be configured to receive the active LED adjustment curve $DC_{ACTIVE}$ and/or the inactive LED adjustment curve $DC_{INACTIVE}$ (e.g., the tables and/or the parameters) via the communication circuit 214. The control circuit 210 may then store the active LED adjustment curve $DC_{ACTIVE}$ and the inactive LED adjustment curve $DC_{INACTIVE}$ (e.g., the tables and/or the parameters) in the memory 216. The control circuit 210 may use the active LED adjustment curve $DC_{ACTIVE}$ to determine the duty cycle $DC_{LED}$ of the LED current through the LED behind the selected (or active) button. The control circuit 210 may use the inactive LED adjustment curve $DC_{INACTIVE}$ to determine the duty cycle $DC_{LED}$ of the LED current through each of the LEDs behind the unselected (or inactive) buttons.

The active LED adjustment curve $DC_{ACTIVE}$ and the inactive LED adjustment curve $DC_{INACTIVE}$ (e.g., the values of the table and/or the parameters) may be adjusted. For example, the active LED adjustment curve $DC_{ACTIVE}$ and the inactive LED adjustment curve $DC_{INACTIVE}$ may be adjusted by the system controller and/or the network device of the load control system, which may transmit new values for the table and/or parameters to the control circuit 210 via the communication circuit 214. Alternatively or additionally, the control circuit 210 may store multiple curves for each of the active LED adjustment curve $DC_{ACTIVE}$ and the inactive LED adjustment curve $DC_{INACTIVE}$ in the memory 216, and may recall one of the multiple curves for each of the active LED adjustment curve $DC_{ACTIVE}$ and the inactive LED adjustment curve $DC_{INACTIVE}$ in response to a digital message received via the communication circuit 214.

Figure 3:
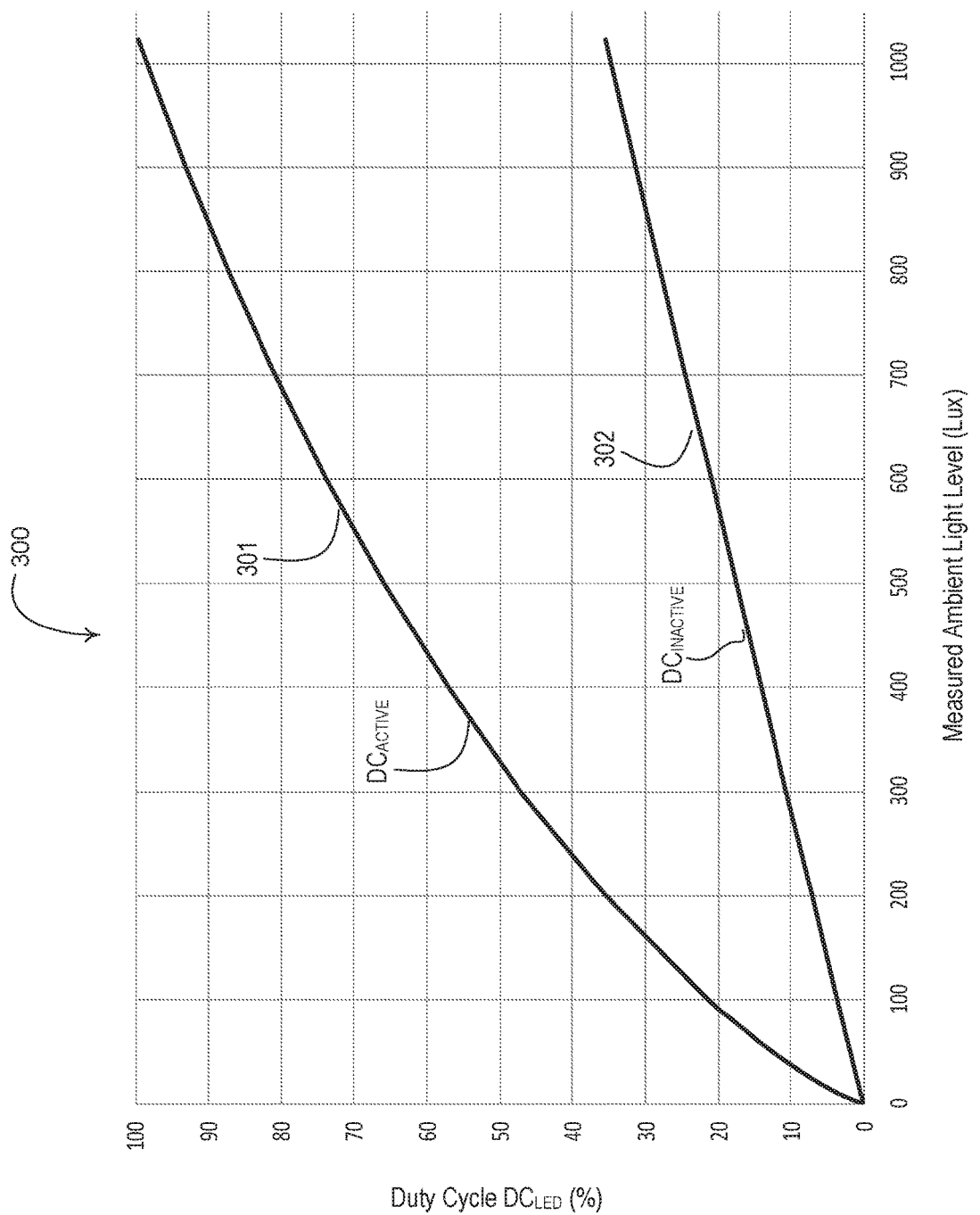
FIG. 3 is a graph that illustrates example adjustment curves for adjusting duty cycles of currents conducted through light-emitting diodes illuminating buttons of a control device in response to a measured ambient light level on a linear scale.
Figure 4:
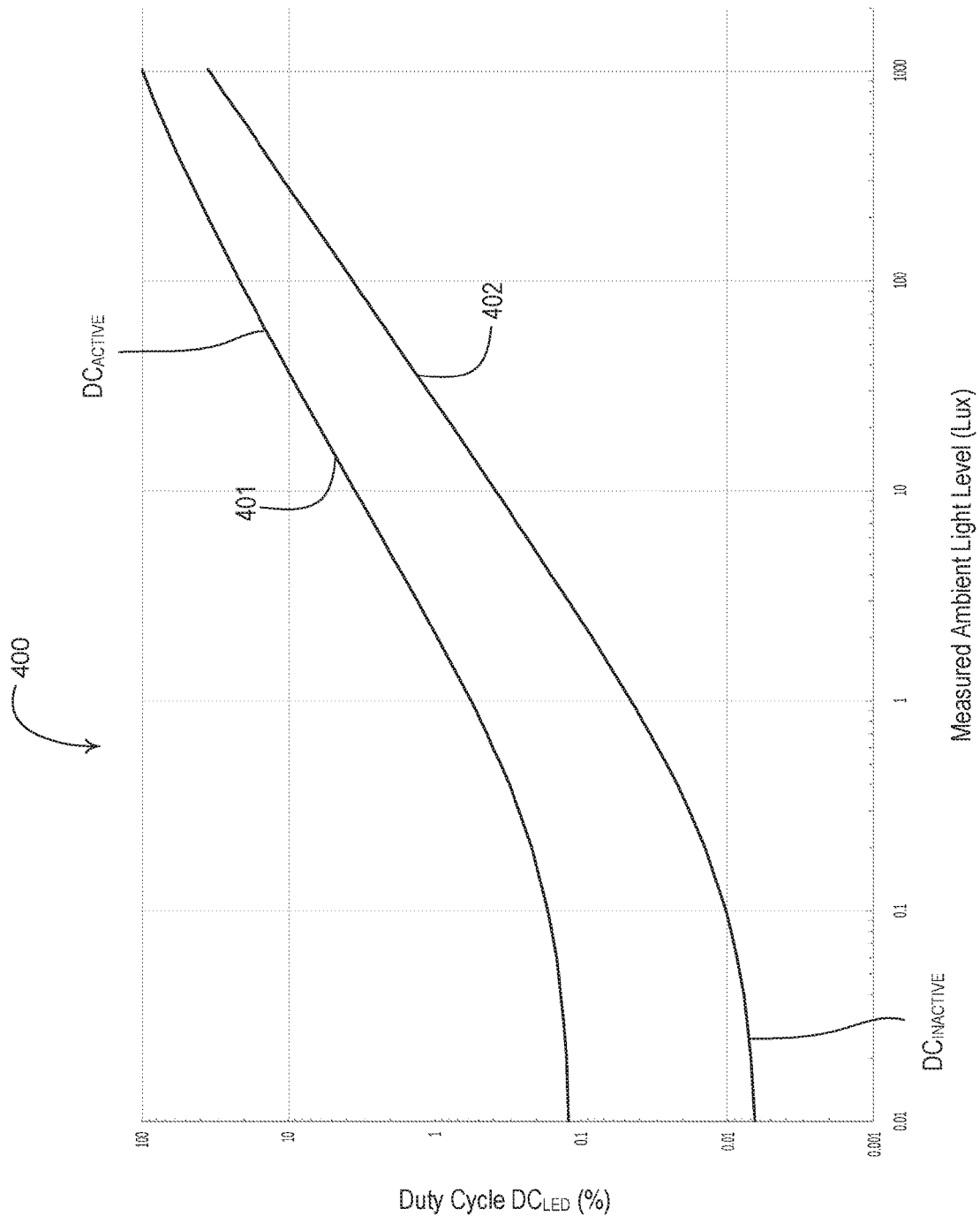
FIG. 4 is a graph that illustrates example adjustment curves for adjusting duty cycles of currents conducted through light-emitting diodes illuminating buttons of a control device in response to a measured ambient light level on a logarithmic scale.

FIGS. 3 and 4 are graphs that illustrate example active and inactive adjustment curves $DC_{ACTIVE}$, $DC_{INACTIVE}$ for adjusting the duty cycle $DC_{LED}$ of the LED current through each of the LEDs in response to the measured ambient light level LAMB. FIG. 3 is a graph 300 that illustrates example active adjustment curve $DC_{ACTIVE}$ 301 and an example inactive adjustment curve $DC_{INACTIVE}$ 302 on a linear scale. FIG. 4 is a graph 400 that illustrates example active adjustment curve $DC_{ACTIVE}$ 401 and an example inactive adjustment curve $DC_{INACTIVE}$ 402 on a logarithmic scale. A control circuit (e.g., the control circuit 210) may store a first adjustment curve (e.g., the active adjustment curve $DC_{ACTIVE}$) in memory for use when determining a first duty cycle $DC_{LED}$ (e.g., for controlling an LED behind the selected button) and a second adjustment curve (e.g., the inactive adjustment curve $DC_{INACTIVE}$) in memory for use when determining a second duty cycle $DC_{LED}$ (e.g., for controlling an LED behind an unselected button).

If, for example, the control circuit is using the active and inactive adjustment curves $DC_{ACTIVE}$, $DC_{INACTIVE}$ 301, 302 and if the measured ambient light level LAMB is approximately 500 Lux, then the control circuit will determine to control the first duty cycle $DC_{LED1}$ of the LED current through the LED behind the control button having the active preset (e.g., the selected button) to approximately 66%, and determine to control the second duty cycle $DC_{LED2}$ of the LED current through each of the LEDs behind the control buttons having the inactive presets (e.g., the unselected buttons) to approximately 17%. Similarly, if the control circuit is using the active and inactive adjustment curves $DC_{ACTIVE}$, $DC_{INACTIVE}$ 401, 402 and if the measured ambient light level LAMB is approximately 10 Lux, then the control circuit will determine to control the first duty cycle $DC_{LED1}$ of the LED current through the LED behind the control button having the active preset (e.g., the selected button) to approximately 3.5%, and determine to control the second duty cycle $DC_{LED2}$ of the LED current through each of the LEDs behind the control buttons having the inactive presets (e.g., the unselected buttons) to approximately 0.4%.

The human eye has a more difficult time discerning contrast in low ambient light levels than in high ambient light levels. Thus, the first duty cycle $DC_{LED1}$ of the active adjustment curve $DC_{ACTIVE}$ may be, for example, over ten times greater than the second duty cycle $DC_{LED2}$ of the inactive adjustment curve $DC_{INACTIVE}$ near a minimum ambient light level LAMB-MIN (e.g., approximately 0 Lux) as shown in FIGS. 3 and 4. Near a maximum ambient light level LAMB-MAX (e.g., approximately 1000 Lux), the first duty cycle $DC_{LED1}$ of the active adjustment curve $DC_{ACTIVE}$ may be, for example, approximately three times greater than the second duty cycle $DC_{LED2}$ of the inactive adjustment curve $DC_{INACTIVE}$.

The active and inactive adjustment curves $DC_{ACTIVE}$ and $DC_{INACTIVE}$ may be non-linearly related (e.g., not proportional), for example, as shown by the example graph 300 in FIG. 3. The difference between the active and inactive adjustment curves $DC_{ACTIVE}$ and $DC_{INACTIVE}$ may be non-linear as the ambient light level ranges from the minimum ambient light level LAMB-MIN to the maximum ambient light level LAMB-MAX. The values of the active and inactive adjustment curves $DC_{ACTIVE}$ and $DC_{INACTIVE}$ may be chosen so that the button having the indicia of the active preset may be visually distinguished (e.g., visually brighter) from the buttons having the indicia of the inactive presets across a range of typical ambient light levels (e.g., between the minimum ambient light level LAMB-MIN and the maximum ambient light level LAMB-MAX). The values of the active and inactive adjustment curves $DC_{ACTIVE}$ and $DC_{INACTIVE}$ may also be chosen so that the button having the indicia of the active preset (e.g., the selected button) and the buttons having the indicia of the inactive presets (e.g., the unselected buttons) may be read across a range of typical ambient light levels (e.g., between the minimum ambient light level LAMB-MIN and the maximum ambient light level LAMB-MAX).

Figure 5:
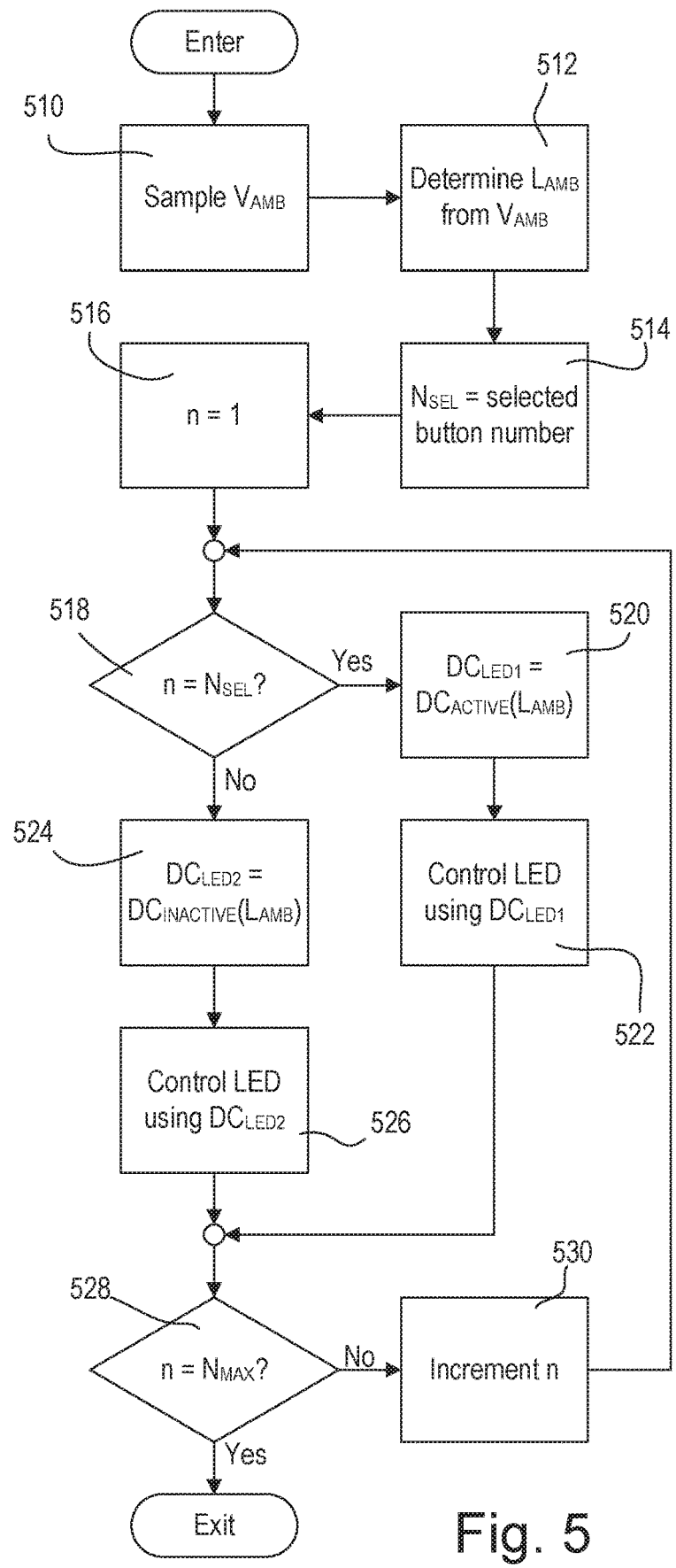
FIG. 5 is a flowchart of an example backlighting procedure.

FIG. 5 is a flowchart of an example backlighting procedure 500 that may be executed periodically by a control circuit (e.g., the control circuit 210) for backlighting a plurality of buttons of a control device (e.g., the buttons 104 of the keypad 100). The control circuit may sample the ambient light detect signal at 510 and determine the measured ambient light level LAMB using the magnitude of the ambient light detect signal at 512. At 514, the control circuit may set a selected-button number $N_{SEL}$ to be equal to the presently selected button (e.g., the button having text indicating the active or selected preset or scene). For example, the number $N_{SEL}$ may be one for the top button, two for the second button, three for the third button, and four for the bottom button of the keypad 100 shown in FIG. 1. In other words, if the Evening button is the selected button, the control circuit will set the number $N_{SEL}$ to three at 514. During the backlighting procedure 500, the control circuit may step through the LEDs behind each of the buttons and determine the correct LED illumination intensity for each of the buttons. The control circuit may use a variable n for stepping through the LEDs during the backlighting procedure 500. At 516, the control circuit may initialize the variable n to one.

The control circuit may determine if the variable n is equal to the selected-button number $N_{SEL}$ at 518. If the control circuit determines that the variable n is equal to the selected-button number $N_{SEL}$ at 518 (e.g., the present button is the selected button), then, at 520, the control circuit may determine the first LED duty cycle $DC_{LED1}$ for the nth LED from the active adjustment curve $DC_{ACTIVE}$ (e.g., according to graph 300 or graph 400) using the measured ambient light level LAMB. The control circuit may pulse-width modulate the LED current conducted through the nth LED using the first LED duty cycle $DC_{LED1}$ at 522. If the control circuit determines that the variable n is not equal to the selected-button number $N_{SEL}$ at 518, then, at 524, the control circuit may determine the second LED duty cycle $DC_{LED2}$ for the nth LED from the inactive adjustment curve $DC_{INACTIVE}$ (e.g., accordingly to graph 300 or graph 400) using the measured ambient light level LAMB. The control circuit may pulse-width modulate the LED current conducted through the nth LED using the second LED duty cycle $DC_{LED2}$ at 526.

At 528, the control circuit may determine if the variable n is equal to a maximum number $N_{MAX}$ (e.g., the number of buttons 104 on the keypad 100). If the control circuit determines that the variable n is not equal to the maximum number $N_{MAX}$ at 528, then, at 530, the control circuit may increment the variable n by one, and the backlighting procedure 500 may loop around to control the intensity of the next LED (e.g., back to 518). If the control circuit determines that the variable n is equal to the maximum number $N_{MAX}$ at 528, then the backlighting procedure 500 may exit.

Illumination from the light source (e.g., LED) behind a button, such as the selected button, may affect the surface illumination intensity of the adjacent buttons (e.g., to not be equal to the second surface illumination intensity $L_{SUR2}$). For example, the illumination from the LED behind the selected button may shine directly on and/or be reflected or refracted onto the rear surfaces of the bodies of the adjacent buttons and cause the surface illumination intensity of the adjacent buttons to increase (and not be equal to the second surface illumination intensity $L_{SUR2}$). Accordingly, to cause all of the buttons other than the selected button to be illuminated to the second illumination intensity $L_{SUR2}$, the control circuit may be configured to decrease the intensities of the LEDs of the buttons next to the selected button below the second LED illumination intensity $L_{LED2}$, such that the resulting illumination intensity of the indicia on the buttons is approximately the second surface illumination intensity $L_{SUR2}$.

Since the indicia of the buttons may be located at a position other than the middle of the button (e.g., towards the topside of the buttons, such as is shown by the text 120 on the buttons 104), the light source behind a specific button (e.g., the selected button) may have a greater effect on the surface illumination intensity of a button closest to the indicia of the specific button (e.g., above the specific button) than on the surface illumination intensity on a button further from the indicia of the specific button (e.g., button below that specific button). For example, assuming the indicia is located towards the topside of the buttons and the buttons are configured in a vertical orientation, the LED behind a selected button may cause a first amount of change $\Delta_{LED-BELOW}$ (e.g., approximately 9%) on the surface illumination of the button below the selected button and a second, greater amount of change $\Delta_{LED-ABOVE}$ (e.g., approximately 15%) on the surface illumination of the button above the selected button. The first and second amount of change $\Delta_{LED-BELOW}$, $\Delta_{LED-ABOVE}$ may be predetermined (e.g., and stored in memory) or may be calculated by the control circuit (e.g., using the ambient light detection circuit).

The control circuit may be configured to adjust for the effect caused by the location of the indicia on the buttons. Using the example provided above, the control circuit may be configured to control the LED of the button below the selected button to a third LED illumination intensity $L_{LED3}$, and to control the LED of the button above the selected button to a fourth LED illumination intensity $L_{LED4}$. The fourth LED illumination intensity $L_{LED4}$ may be less than the third LED illumination intensity $L_{LED3}$. The control circuit may be configured to control the illumination of the LEDs to the third and fourth LED illumination intensities $L_{LED3}$, $L_{LED4}$, for example, by controlling the LED current through the respective LED using respective third and fourth LED duty cycles $DC_{LED2'}$, $DC_{LED2''}$.

The third and fourth LED duty cycles $DC_{LED2'}$, $DC_{LED2''}$ may be calculated using the inactive duty cycle curve $DC_{INACTIVE}$ and/or the second LED duty cycle $DC_{LED2}$. For example, the third and fourth LED duty cycles $DC_{LED2'}$, $DC_{LED2''}$ may be calculated by multiplying the second LED duty cycle $DC_{LED2}$ by predetermine values (e.g., a first predetermined value based on the predetermined amount of change $\Delta_{LED-BELOW}$, and a second predetermined value based on the predetermined amount of change $\Delta_{LED-ABOVE}$). If the indicia on the buttons is located towards the center of the buttons, the control circuit may be configured to control the LEDs of the buttons below and above the selected button to the same LED illumination intensity (e.g., the amount of change $\Delta_{LED-BELOW}$ may be the same as the amount of change $\Delta_{LED-ABOVE}$).

Figure 6:
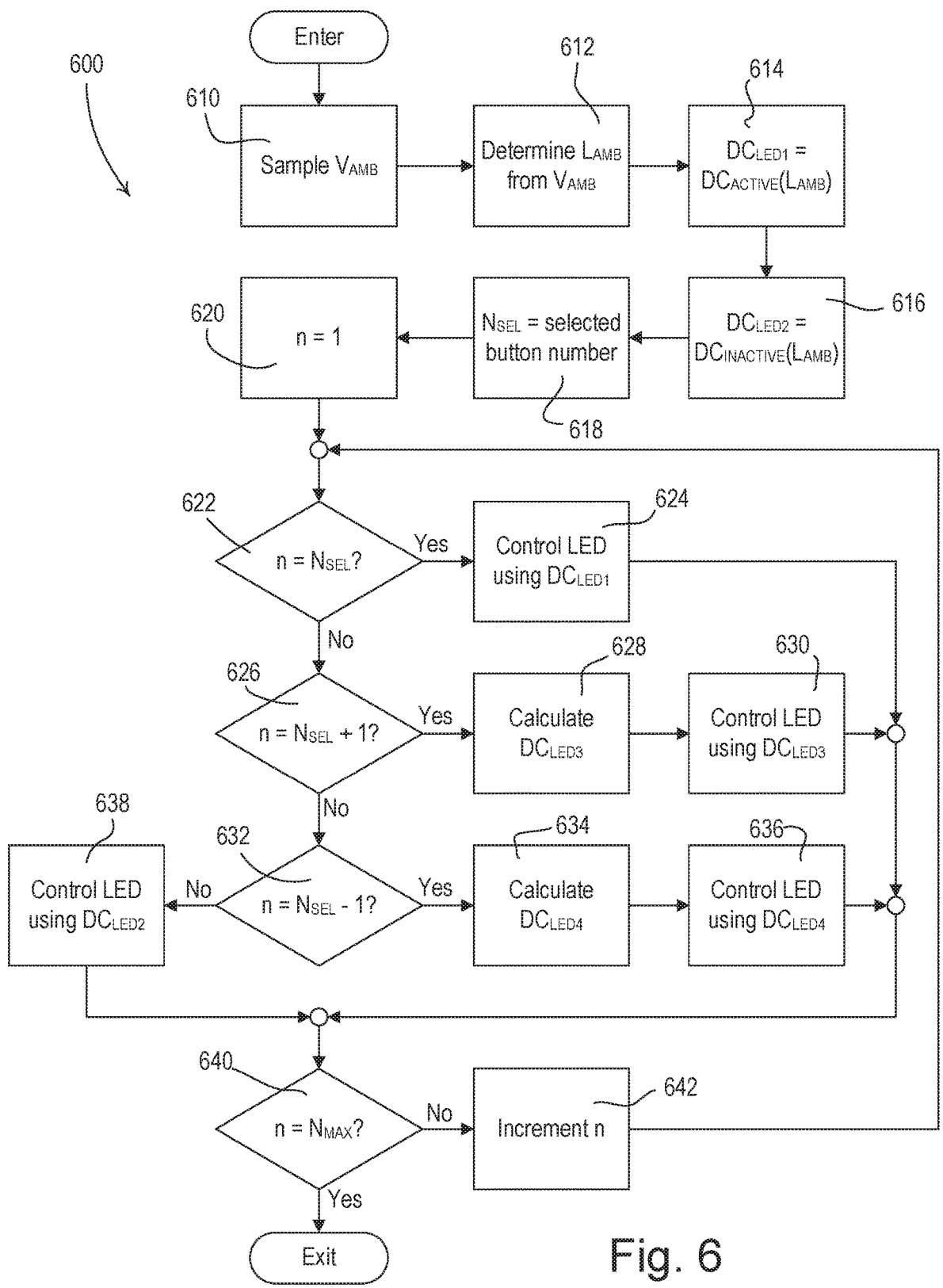
FIG. 6 is a flowchart of another example backlighting procedure.

FIG. 6 is a flowchart of another example backlighting procedure 600. The backlighting procedure 600 may be executed (e.g., periodically) by a control circuit (e.g., the control circuit 210) for backlighting a plurality of buttons of a control device (e.g., the buttons 104 of the keypad 100). The control circuit may sample an ambient light detect signal at 610. The control circuit may determine the measured ambient light level LAMB using the magnitude of the ambient light detect signal at 612. The control circuit may determine the first LED duty cycle $DC_{LED}$-BELOW from the active adjustment curve $DC_{ACTIVE}$ (e.g., accordingly to the graph 300 or the graph 400) using the measured ambient light level LAMB at 614, and may determine the second LED duty cycle $DC_{LED2}$ from the inactive adjustment curve $DC_{ACTIVE}$ using the measured ambient light level LAMB at 616. At 618, the control circuit may set a selected-button number $N_{SEL}$ to be equal to the presently selected button (e.g., the selected button having indicia indicating the active or selected preset or scene). During the backlighting procedure 600, the control circuit may step through the LEDs behind each of the buttons and determine the correct LED illumination intensity for each of the buttons. The control circuit may use a variable n for stepping through the LEDs during the backlighting procedure 600. At 620, the control circuit may initialize the variable n to one.

At 622, the control circuit may determine whether the variable n is equal to the selected-button number $N_{SEL}$. If the control circuit determines that the variable n is equal to the selected-button number $N_{SEL}$ at 622 (e.g., the present button is the selected button), then the control circuit may control the LED current conducted through the LED behind the selected button using the first LED duty cycle $DC_{LED1}$ at 624. If the control circuit determines that the variable n is not equal to the selected-button number $N_{SEL}$ at 622, then the control circuit determines whether variable n is equal to the selected-button number $N_{SEL}$ plus one at 626. If the control circuit determines that the variable n is equal to the selected-button number $N_{SEL}$ plus one at 626 (e.g., determines that the button is the button below the selected button), then the control circuit may calculate the third LED duty cycle $DC_{LED2'}$ at 628. For example, the control circuit may calculate the third LED duty cycle $DC_{LED2'}$ based on the first amount of change $\Delta_{LED-BELOW}$ caused by the LED behind the selected button on the button below the selected button. For example, the control circuit may calculate the third LED duty cycle $DC_{LED2'}$ according to $$DC_{LED2'}=DC_{LED2}-(DC_{LED-BELOW}-DC_{LED2})\cdot\Delta_{LED-BELOW}.$$

At 630, the control circuit may pulse-width modulate the LED current conducted through the LED behind the button below the selected button using the third LED duty cycle $DC_{LED2'}$.

If the control circuit determines that the variable n is not equal to the selected-button number $N_{SEL}$ plus one at 626, then the control circuit may determine whether the variable n is equal to the selected-button number $N_{SEL}$ minus one at 632. If the control circuit determines that the variable n is equal to the selected-button number $N_{SEL}$ minus one at 632 (e.g., determines that the button is the button above the selected button), then the control circuit may calculate the fourth LED duty cycle $DC_{LED2''}$ at 634. For example, the control circuit may calculate the fourth LED duty cycle $DC_{LED2''}$ based on the second amount of change $\Delta_{LED-ABOVE}$ caused by the LED behind the selected button on the button above the selected button. For example, the control circuit may calculate the fourth LED duty cycle $DC_{LED2''}$ according to $$DC_{LED2''}=DC_{LED2}-(DC_{LED-BELOW}-DC_{LED2})\cdot\Delta_{LED-ABOVE}.$$

At 636, the control circuit may pulse-width modulate the LED current conducted through the LED behind the button above the selected button using the fourth LED duty cycle $DC_{LED2''}$. If the control circuit determines that the variable n is not equal to the selected-button number $N_{SEL}$ minus one at 632, then the control circuit may pulse-width modulate the LED current conducted through the nth LED using the second LED duty cycle $DC_{LED2}$ at 638.

After setting the LED illumination intensity at 624, 630, 636, and 638, the control circuit may determine if the variable n is equal to a maximum number $N_{MAX}$ (e.g., the number of buttons 104 on the keypad 100) at 640. If the variable n is not equal to the maximum number $N_{MAX}$ at 640, the control circuit may increment the variable n by one at 642, before the procedure 600 loops around the set the LED illumination intensity for the next LED (e.g., the procedure returns to 622). If the variable n is equal to the maximum number $N_{MAX}$ at 640, the procedure 600 may exit.

A user may customize one or more of the adjustment curves (e.g., the active and/or inactive adjustment curves $DC_{ACTIVE}$, $DC_{INACTIVE}$), for example, using a control device (e.g., the control device 200), an external device (e.g., the system controller or the network device of the load control system), and/or the ambient light detection circuit. The control device may generate one or more adjustment curves based on user input. For example, the user may customize one or more adjustment curves by adjusting one or more parameters, such as, a scaling factor (e.g., a slope) and/or an offset (e.g., a y-axis intercept) of each adjustment curve, by adjusting an intensity contrast between the curves, by setting an LED illumination intensity $L_{LED}$ at a particular ambient light level LAMB, and/or the like. When adjusting the parameters of the curves, the parameters of both the active adjustment curve $DC_{ACTIVE}$ and the inactive adjustment curve $DC_{INACTIVE}$ may be adjusted (e.g., simultaneously). When adjusting the intensity contrast between the curves, the parameters of one of the curves (e.g., the active adjustment curve $DC_{ACTIVE}$) may be adjusted while the other curve (e.g., the inactive adjustment curve $DC_{INACTIVE}$) remains constant. For example, adjusting the parameters of both curves may be beneficial when the user would like to make both curves more or less bright, and adjusting the intensity contrast may be beneficial when the user would like to increase or decrease the contrast between the selected and unselected buttons.

The user may customize an adjustment curve, for example, via a user interface located on the control device (e.g., the button 104 of the keypad 100), through an external user interface (e.g., via a smartphone that communicates with the control device through wireless communication, through a device that communicates with the control device through wired communication, etc.), and/or the like. For example, an external device (e.g., smartphone, tablet, PC, etc.) may include a user interface that allows the user to customize one or more adjustment curves, and the customized adjustment curve(s) may be downloaded by and stored in memory on the control device. The user may select between a plurality of predefined adjustment curves, and/or the user may create and/or customize one or more adjustment curves. For example, the control device may be configured such that the user may set/select the active and/or inactive surface illumination intensities $L_{SUR1}$, $L_{SUR2}$ for the when the room is dark (e.g., one or more lights in the room are off), and set/select the active and inactive surface illumination intensities $L_{SUR1}$, $L_{SUR2}$ for when the room is bright (e.g., one or more lights in the room are on, for example, at full intensity). Thereafter, the control device may automatically generate the active and/or inactive adjustment curves $DC_{ACTIVE}$, $DC_{INACTIVE}$ by scaling between those two points. For example, the y-axis intercept of the active adjustment curve $DC_{ACTIVE}$ may be set according to the selected active surface illumination intensity $L_{SUR1}$ at the measured ambient light level LAMB when the room is dark. The scaling factor of the active adjustment curve $DC_{ACTIVE}$ may be set so as to cause the predetermined function defining the active adjustment curve $DC_{ACTIVE}$ to reach the selected active surface illumination intensity $L_{SUR1}$ at the measured ambient light level LAMB when the room is bright.

A user may customize one or more of the adjustment curves using the ambient light detection circuit. The control device may, for example, receive an input (e.g., from an external device) that indicates a change in the ambient light detection circuit, which may adjust one or more of the adjustment curves. For example, the input may indicate a change in the gain of the ambient light detection circuit, which in turn would adjust the measured ambient light and the adjustment curves themselves.

After the user creates or selects the adjustment curves, the control circuit (e.g., the control circuit 210) may store the customized adjustment curves (e.g., tables and/or parameters) in memory for use when determining a first duty cycle $DC_{LED}$ (e.g., based on the active adjustment curve $DC_{ACTIVE}$, and for controlling the LED behind the selected button) and a second duty cycle $DC_{LED}$ (e.g., based on the inactive adjustment curve $DC_{INACTIVE}$, and for controlling the LED behind an unselected button). The control circuit may be configured with (e.g., store) more than one active adjustment curve $DC_{ACTIVE}$ and/or more than one inactive adjustment curve $DC_{INACTIVE}$. As such, the control device user may select between multiple active/inactive adjustment curves quickly and easily. Further, the adjustment curves may be shared between multiple different control devices (e.g., control devices located throughout the same room, in different rooms in the same building, and/or in different rooms in different buildings) via direct communication between the control devices and/or through a central hub. The adjustment curves may be copied from one control device to another control device (e.g., may be transmitted between control devices and stored by the receiving control device).

Figure 7:
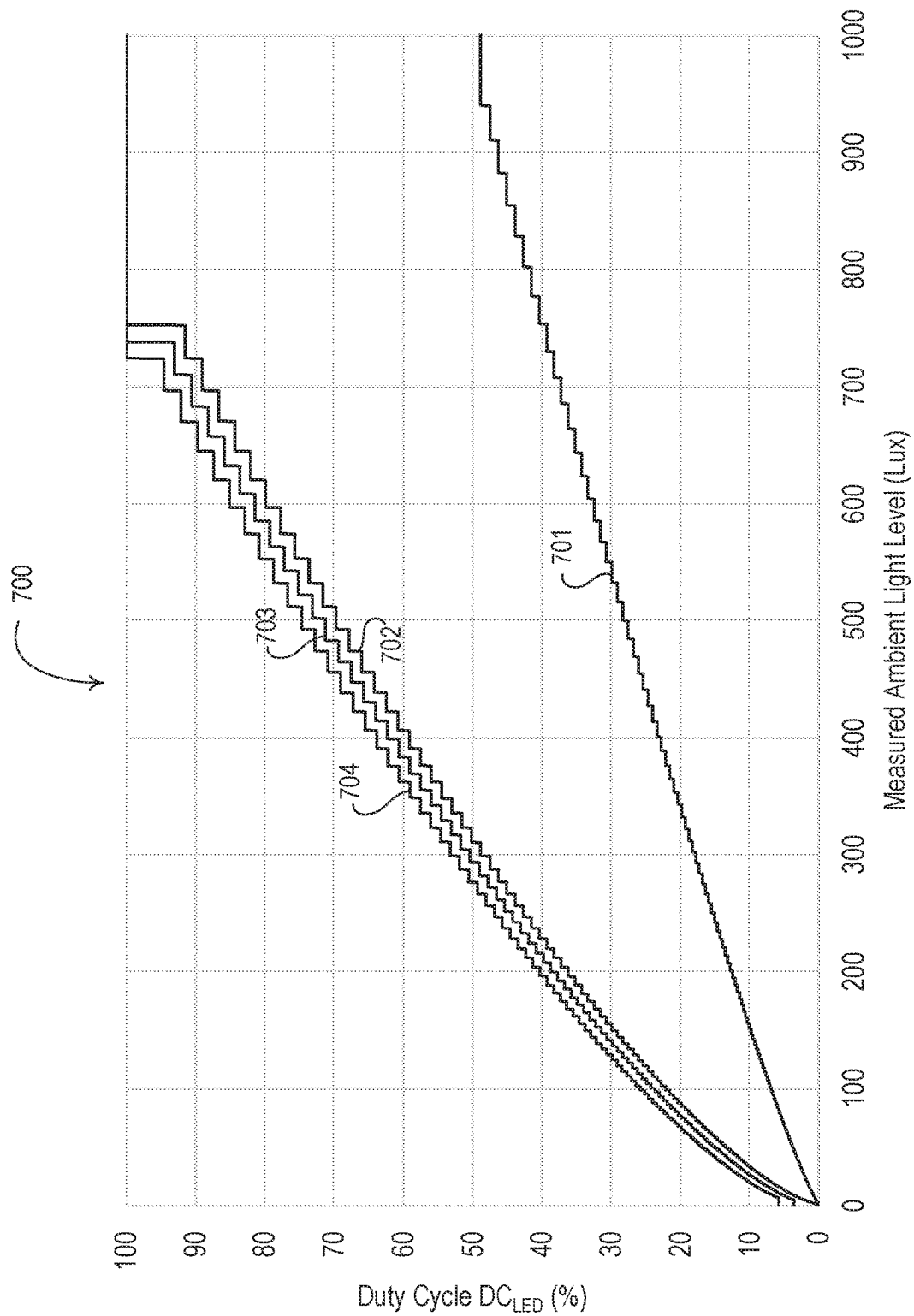
FIG. 7 is a graph that illustrates example adjustment curves for adjusting duty cycles of currents conducted through light-emitting diodes illuminating buttons of a control device in response to a measured ambient light level.

FIG. 7 is a graph that illustrates example adjustment curves for adjusting duty cycles of currents conducted through light-emitting diodes illuminating buttons of a control device (e.g., the control device 200) in response to a measured ambient light level. Graph 700 illustrates examples of three different active adjustment curves 702, 703, and 704, and one example inactive adjustment curve 701. The active adjustment curve 702 may be considered a low active adjustment curve (e.g., characterized by lower contrast between the intensities associated with the active adjustment curve 702 and the inactive adjustment curve 701), the active adjustment curve 703 may be considered a medium active adjustment curve (e.g., characterized by a medium amount of contrast between the intensities associated with the active adjustment curve 703 and the inactive adjustment curve 701), and the active adjustment curve 704 may be considered a high active adjustment curve (e.g., characterized by higher contrast between the intensities associated with the active adjustment curve 704 and the inactive adjustment curve 701). The medium active adjustment curve 703 may be determined based on a first offset value above the low active adjustment curve 702, and the high active adjustment curve 704 may be determined based on a second offset value above the low active adjustment curve 702. The first and second offset values may be functions of the measured ambient light level (e.g., the first and second offset values may increase as the measured ambient light level increases).

The control device may receive one of the active adjustment curves 702, 703, and 704 via a communication circuit and may store the received one of the active adjustment curves 702, 703, and 704 in memory for use when determining a first duty cycle $DC_{LED}$ (e.g., for controlling the LED behind the selected button)

The control devices described herein (e.g., the keypad 100 and/or the control device 200) may be configured to control a variety of electrical loads. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. A keypad for use in a load control system for controlling power delivered to one or more electrical loads, the keypad comprising:
    a first button and a second button separate from the first button;
    a first light source to backlight the first button, and a second light source to backlight the second button;
    a light detector circuit configured to measure an ambient light level in a vicinity of the keypad;
    a memory for storing an active button adjustment curve and an inactive button adjustment curve, wherein the active button and the inactive button adjustment curves are non-linearly related;
    a communication circuit configured to communicate messages to the one or more electrical loads; and
    a control circuit configured to, in response to an actuation of the first button:
        associate the first button as the active button and associate the second button as the inactive button;
        transmit a message for causing the power to the one or more electrical loads to be controlled according to a preset;

simultaneously cause the first light source to backlight the first button at a first intensity and the second light source to backlight the second button at a second intensity, the first intensity greater than the second intensity; and adjust the first intensity in response to the ambient light level measured by the light detector circuit using the active button adjustment curve, and adjust the second intensity in response to the ambient light level measured by the light detector circuit using the inactive button adjustment curve.

2. The keypad of claim 1, wherein the control circuit is configured to receive a message from an external device via the communication circuit, the message comprising information relating to at least one of the active button adjustment curve or the inactive button adjustment curve, the control circuit configured to adjust at least one of the active button adjustment curve or the inactive button adjustment curve stored in the memory in response to the information received via the message.

3. The keypad of claim 2, wherein the control circuit is configured to adjust the active button adjustment curve and maintain the inactive button adjustment curve the same in response to the information received via the message to control a contrast between the first and the second intensities associated with the active button adjustment curve and inactive button adjustment curves.

4. The keypad of claim 2, wherein the information relating to the at least one of the active button adjustment curve or the inactive button adjustment curve comprises at least one of a scaling factor or an offset, and the control circuit is configured to generate the active button adjustment curve and inactive button adjustment curves based on the at least one of the scaling factor or the offset.

5. The keypad of claim 1, wherein the first light source and the second light source comprise respective first and second light-emitting diodes (LEDs), and the control circuit is configured to pulse-width modulate a first LED current conducted through the first LEDs to adjust the first intensity, and to pulse-width modulate second LED current conducted through the second LEDs to adjust the second intensity.

6. The keypad of claim 5, wherein the control circuit is configured to determine a first LED duty cycle for the first LED current based on the active button adjustment curve, and to determine a second LED duty cycle for the second LED current based on the inactive button adjustment curve.

7. The keypad of claim 1, wherein the control circuit is configured to transmit a message to an external load control device via a communication link for controlling at least one of the one or more electrical loads.

8. The keypad of claim 7, wherein the communication link comprises a wired communication link or a wireless communication link.

9. The keypad of claim 1, wherein the control circuit is further configured to set the first button as active and the second button as inactive in response to the actuation of the first button.

10. The keypad of claim 1, wherein the first light source additionally includes a light source located to the side of the first button and the second light source additionally includes a light source located to the side of the second button.

11. The keypad of claim 1, wherein the first button comprises first indicia indicating the preset that is selected in response to the actuation of the first button.

12. A keypad for use in a load control system for controlling power delivered to one or more electrical loads, the keypad comprising:
a first button and a second button separate from the first button;
a first light source configured to illuminate a first portion of the keypad that includes the first button, and a second light source configured to illuminate a second portion of the keypad that includes the second button;
a light detector circuit configured to measure an ambient light level in a vicinity around the keypad;
a memory for storing an active button adjustment curve and an inactive adjustment curve, wherein the active button and the inactive button adjustment curves are non-linearly related;
a communication circuit configured to communicate messages; and
a control circuit configured to, in response to an actuation of the first button:
transmit a message for causing the power to the one or more electrical loads;
simultaneously cause the first light source to illuminate the first portion to a first illumination intensity and the second light source to illuminate the second portion to a second illumination intensity, the second illumination intensity less than the first illumination intensity; and
adjust the first illumination intensity in response to the ambient light level measured by the light detector circuit using the active button adjustment curve, and adjust the second illumination intensity in response to the ambient light level measured by the light detector circuit using the inactive button adjustment curve.

13. The keypad of claim 12, wherein the first portion of the keypad comprises a first indicia indicating a function of the first button, and the second portion of the keypad includes a second indicia indicating a function of the second button.

14. The keypad of claim 12, further comprising:
a faceplate comprising indicia, the indicia defining the first location;
wherein the second button defines the second location.

15. The keypad of claim 12, further comprising:
a faceplate comprising a first indicia and a second indicia, the first indicia defining the first portion and the second indicia defining the second portion.

16. The keypad of claim 12, wherein the first light source and the second light source comprise respective first and second light-emitting diodes (LEDs);
wherein the control circuit is configured to pulse-width modulate a first LED current conducted through the first LEDs to adjust the first illumination intensity, and to pulse-width modulate a second LED current conducted through the second LEDs to adjust the second illumination intensity, and wherein the control circuit is configured to determine a first LED duty cycle for the first LED current based on the active button adjustment curve, and to determine a second LED duty cycle for the second LED current based on the inactive button adjustment curve.

* * * * *